(12) United States Patent
Burnham

(10) Patent No.: US 7,278,680 B2
(45) Date of Patent: Oct. 9, 2007

(54) STRUCTURAL CARRIER ASSEMBLY FOR A MOTOR VEHICLE

(75) Inventor: William M. Burnham, Clarkston, MI (US)

(73) Assignee: Lanxess Corporation, Pittsburgh, PA (US)

( * ) Notice: Subject to any disclaimer, the term of this patent is extended or adjusted under 35 U.S.C. 154(b) by 335 days.

(21) Appl. No.: 10/780,096

(22) Filed: Feb. 17, 2004

(65) Prior Publication Data
US 2005/0178604 A1 Aug. 18, 2005

(51) Int. Cl.
*B62D 25/08* (2006.01)
(52) U.S. Cl. .................................. 296/193.09
(58) Field of Classification Search ........... 296/193.09, 296/203.02, 29
See application file for complete search history.

(56) References Cited

U.S. PATENT DOCUMENTS

| | | | | |
|---|---|---|---|---|
| 5,271,473 | A * | 12/1993 | Ikeda et al. ................. | 180/68.4 |
| 6,260,609 | B1 * | 7/2001 | Takahashi ..................... | 165/69 |
| 6,364,403 | B1 * | 4/2002 | Ozawa et al. .......... | 296/187.09 |
| 6,450,276 | B1 * | 9/2002 | Latcau ....................... | 180/68.4 |
| 6,474,727 | B1 * | 11/2002 | Guyomard ............ | 296/193.09 |
| 6,685,258 | B2 * | 2/2004 | Brogly et al. .......... | 296/203.02 |
| 6,712,426 | B2 * | 3/2004 | Ritchie et al. ......... | 296/187.09 |
| 6,880,883 | B2 * | 4/2005 | Decker et al. .......... | 296/203.02 |
| 2001/0001994 | A1 * | 5/2001 | Enomoto et al. .......... | 180/68.4 |
| 2005/0062315 | A1 * | 3/2005 | Andritter et al. ...... | 296/193.09 |
| 2005/0088015 | A1 * | 4/2005 | Kishikawa et al. .... | 296/193.09 |
| 2005/0206200 | A1 * | 9/2005 | Tazaki et al. .......... | 296/203.02 |
| 2005/0275248 | A1 * | 12/2005 | Lee ........................ | 296/193.09 |

FOREIGN PATENT DOCUMENTS

EP    0945330    * 9/1999

* cited by examiner

*Primary Examiner*—H Gutman
(74) *Attorney, Agent, or Firm*—Nicanor A. Kohncke (57) ABSTRACT

The structural carrier assembly is installed in a motor vehicle front or rear end. The structural carrier assembly includes one or more support brackets connected to one or more frame rails of a motor vehicle body. The structural carrier assembly further includes a carrier member having laterally positioned attachment clips. The attachment clips connect the carrier member to the support brackets. The carrier member includes one or more attachment mounts or locations for supporting accessories, such as engine accessories, of the motor vehicle. A cross frame is mounted to an upper end of the carrier member by welds or mechanical attachments. The attachment clips each include an integral fulcrum cup and locking tab typically formed on the lateral sides of the carrier member. The locking tabs engage mating openings formed in the support brackets to connect the carrier member to the frame rails.

33 Claims, 7 Drawing Sheets

STRUCTURAL CARRIER ASSEMBLY FOR A MOTOR VEHICLE

BACKGROUND OF THE INVENTION

1. Field of the Invention

The present invention relates generally to motor vehicles, such as passenger cars and light trucks. More particularly, the present invention relates generally to a structural carrier assembly adapted for installation in a motor vehicle front or rear end for mounting various accessories.

2. Description of Related Art

Currently, the front and rear ends of most motor vehicles are built into the vehicle body one piece or component at a time. The installation of literally hundreds of different components in the motor vehicle requires the manufacturer to maintain lengthy, complex, and costly assembly lines as well as extensive tooling and fixtures. This complexity is due not only to the high number of parts involved, but also the assembly methods currently used in the automotive industry and the amount of on-line adjusting and repair that is often needed to correct assembly defects. Additionally, the well-known assembly line manufacturing process is highly labor intensive, again due mainly to the high number of parts and assembly methods currently used in the automotive industry.

Typically, once a painted vehicle body comes to the finish assembly line, hundreds of individual components are assembled to the vehicle body. The numerous individual components are used to complete the suspension system, steering system, braking system, powertrain, cooling system, electrical system, etc. As indicated previously, the individual components comprising these systems are typically added to the vehicle body one-by-one or in small subgroups to finish the assembly of the motor vehicle.

The large number of components required to assemble a motor vehicle requires the assembly line to be extremely long and requires many people to accomplish numerous discreet tasks along the assembly line. This makes the process of motor vehicle assembly unnecessarily slow and complicated and adversely affects the quality and reliability of the motor vehicle when it is completed. Additionally, the confined space within which the workers operate makes on-line service and repair tasks difficult. The current system for assembling motor vehicles is needlessly complex, slow, and expensive; the invention described hereinafter reduces the complexity and cost, and increases speed of motor vehicle manufacturing.

SUMMARY OF THE INVENTION

The present invention relates generally to motor vehicles comprising a vehicle body having one or more frame rails extending from the vehicle body to which a structural carrier assembly in accordance with the present invention is mounted.

The structural carrier assembly may be adapted for connection to front frame rails extending forward from the vehicle body, or to rear frame rails extending rearward from the vehicle body. The structural carrier assembly is generally adapted for quick, secure, and easy installation into the front or rear ends of a motor vehicle and may be used to mount various front or rear end elements or accessories of the motor vehicle.

Such front end elements or accessories may include various front end vehicle systems, such as steering and braking systems, powertrain, cooling system, electrical system, and the like, which are typically located in the front end of most motor vehicles. Such elements or accessories may be assembled to the structural carrier assembly and the assembly installed as a distinct module in the motor vehicle front end, thereby streamlining the manufacturing process. The structural carrier assembly may be used in similar fashion to mount motor vehicle systems and accessories located at the rear of the vehicle body, depending on where the structural carrier assembly is to be installed.

In one embodiment, the present invention is a structural carrier assembly for a motor vehicle front or rear end. The structural carrier assembly generally includes at least one support bracket adapted for connection to at least one frame rail extending from a motor vehicle body. The at least one frame rail may be a front frame rail extending forward from a motor vehicle body, or a rear frame rail extending rearward from the motor vehicle body. Typically, the at least one support bracket includes a pair of support brackets adapted for connection to two front or two rear frame rails extending from a motor vehicle body, respectively.

The structural carrier assembly generally further includes a unitary carrier member adapted for connection to the at least one support bracket. The at least one support bracket is adapted to support the carrier member on the at least one frame rail. At least one attachment clip and, typically, a pair of attachment clips, may be provided on one of the carrier member and the at least one support bracket and be adapted to engage the other of the carrier member and the at least one support bracket. The at least one attachment clip secures the connection between the carrier member and the at least one support bracket. As indicated, the at least one attachment clip typically includes a pair of attachment clips. The attachment clips are typically located on lateral sides or edges of the carrier member for engaging a pair of support brackets, respectively.

The carrier member and the at least one support bracket may each be formed of metal, such as steel, stainless steel, aluminum, or magnesium. Additionally, the carrier member and the at least one support bracket may each be formed of plastic, such as a thermoplastic or thermoset material. Moreover, the carrier member and the at least one support bracket may be made of a filled or reinforced material. Further, the carrier member and the at least one support bracket may each be formed of different materials, such as metal and plastic, in accordance with the present invention. The structural carrier assembly may further include a cross frame mounted to an upper end of the carrier member by, for example, removable mechanical attachments or by permanent welds.

The at least one attachment clip may include an integral fulcrum cup and a locking tab provided on the carrier member. For example, the integral fulcrum cup and locking tab may be formed integrally with the carrier member, or formed separately from the carrier member and secured to the carrier member by welds, mechanical attachment, adhesive, snap-fit connection, and like fastening or securing techniques used in the motor vehicle industry. The locking tab may be adapted to engage a mating opening formed in the at least one support bracket to connect the carrier member to the at least one support bracket and, further, to the at least one front or rear frame rail. The locking tab is typically shaped to engage a polygonal-shaped mating opening in the at least one support bracket, for example a substantially L-shaped or T-shaped mating opening. The present invention is not necessarily limited to polygonal-shaped mating openings, such as the aforementioned L-shaped or T-shaped mating opening configurations, and may encompass circular or oval shaped mating openings. The fulcrum cup may be adapted to receive at least a portion of the at least one support bracket when the at least one attachment clip connects the carrier to the at least one support bracket. The fulcrum cup may be substantially semi-circular shaped.

The carrier member may also include at least one integrally formed attachment mount, such as one or more attachment points or defined openings in the carrier member, adapted to support at least one accessory of the motor vehicle, such as an engine cooling accessory.

In another embodiment, the present invention is a structural carrier assembly for a motor vehicle front end. The structural carrier assembly generally includes at least one support bracket adapted for connection to at least one front frame rail extending forward from a motor vehicle body and, preferably, a pair of support brackets adapted for connection to a pair of front frame rails of a motor vehicle body. Additionally, the structural carrier assembly generally includes a unitary carrier member having at least one attachment clip adapted for engagement with the at least one support bracket for securing a connection between the carrier member and the at least one support bracket. The at least one support bracket is adapted to support the carrier member on the at least one front frame rail.

The carrier member and the at least one support bracket may each be formed of metal, such as steel, stainless steel, aluminum, or magnesium. Additionally, the carrier member and the at least one support bracket may each be formed of plastic, such as a thermoplastic or thermoset material. Moreover, the carrier member and the at least one support bracket may be made of a filled or reinforced material. Further, the carrier member and the at least one support bracket may each be formed of different materials, such as metal and plastic, in accordance with the present invention. The structural carrier assembly may further include a cross frame mounted to an upper end of the carrier member by, for example, removable mechanical attachments or by permanent welds.

The at least one attachment clip may include an integral fulcrum cup and a locking tab provided on the carrier member. For example, the integral fulcrum cup and locking tab may be formed integrally with the carrier member, or formed separately from the carrier member and secured to the carrier member by welds, mechanical attachment, adhesive, snap-fit connection, and like fastening or securing techniques used in the motor vehicle industry. The locking tab may be adapted to engage a mating opening formed in the at least one support bracket to connect the carrier member to the at least one support bracket and, further, to the at least one front frame rail. The locking tab is typically shaped to engage a polygonal-shaped mating opening in the at least one support bracket, for example a substantially L-shaped or T-shaped mating opening. As indicated, the present invention is not necessarily limited to polygonal-shaped mating openings, such as the aforementioned L-shaped or T-shaped mating opening configurations, and may encompass circular or oval shaped mating openings. The fulcrum cup may be adapted to receive at least a portion of the at least one support bracket when the at least one attachment clip connects the carrier to the at least one support bracket. The fulcrum cup may be substantially semi-circular shaped.

The carrier member may also include at least one integrally formed attachment mount, such as one or more attachment points or defined openings in the carrier member, adapted to support at least one accessory of the motor vehicle, such as an engine cooling accessory.

Additionally, the present invention is directed to a method of installing the structural carrier assembly in a motor vehicle front or rear end. The method generally includes attaching at least one support bracket to at least one frame rail extending from a motor vehicle body, and positioning the carrier member on the at least one support bracket. The carrier member may then be rotated relative to the at least one frame rail, such that at least one attachment clip provided on one of the carrier member and the at least one support bracket engages the other of the carrier member and the at least one support bracket, and secures a connection between the carrier member and the at least one support bracket. Typically, the carrier member will engage a pair of support brackets mounted to a pair of front or rear frame rails, respectively. The at least one attachment clip will typically include a pair of attachment clips located on lateral sides of the carrier member or on the support brackets, respectively, and be used to secure the connection between the carrier member and the pair of support brackets. The method may further include mounting a cross frame to an upper end of the carrier member, for example with mechanical fasteners or welds.

As discussed previously, the at least one attachment clip may include an integral fulcrum cup and locking tab provided on one of the carrier member and the at least one support bracket. The locking tab may be adapted to engage a mating opening formed in the other of the carrier member and the at least one support bracket, such that when the carrier member is rotated the locking tab engages the mating opening and secures a connection between the carrier member and the at least one support bracket. The locking tab may be shaped to engage a polygonal-shaped mating opening, such as a substantially L-shaped or T-shaped mating opening. As-indicated previously, the present invention is not necessarily limited to polygonal-shaped mating openings, such as the aforementioned L-shaped or T-shaped mating opening configurations, and may encompass circular or oval shaped mating openings. The fulcrum cup is generally adapted to align the carrier member on the at least one support bracket when the carrier member is rotated, such that the locking tab automatically engages the mating opening during the rotation.

As also indicated previously, the at least one attachment clip may be provided on the carrier. In particular, the at least one attachment clip may include an integral fulcrum cup and locking tab provided on the carrier member. The locking tab may be adapted to engage a mating opening formed in the at least one support bracket, such that when the carrier member is rotated the locking tab engages the mating opening and secures a connection between the carrier member and the at least one support bracket. The fulcrum cup is generally adapted to align the carrier member on the at least one support bracket when the carrier member is rotated, such that the locking tab automatically engages the mating opening during the rotation. The fulcrum cup generally receives at least a portion of the at least one support bracket when the at least one attachment clip connects the carrier member to the at least one support bracket. An adhesive may be applied to the at least one attachment clip prior to the at least one attachment clip securing the connection between the carrier member and the at least one support bracket.

Further details and advantages of the present invention will become apparent from the following detailed descrip-

DETAILED DESCRIPTION OF THE INVENTION

For purposes of the description hereinafter, the terms "upper", "lower", "right", "left", "vertical", "horizontal", "top", "bottom", and derivatives thereof, shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered limiting.

Referring to FIGS. 1-4, a structural carrier assembly 10 and components thereof in accordance with the present invention are shown. The structural carrier assembly 10 generally includes a structural carrier member 12, described in further detail herein, adapted for connection to frame rails 14, 16 extending from a motor vehicle body (not shown). The structural carrier assembly 10 is intended for use in the front end or rear end structure of a motor vehicle body (not shown). Typical motor vehicle body structures include multiple interconnected frame members that form the skeleton of the motor vehicle body and to which the various many components and subsystems of the motor vehicle are affixed.

Figure 1:
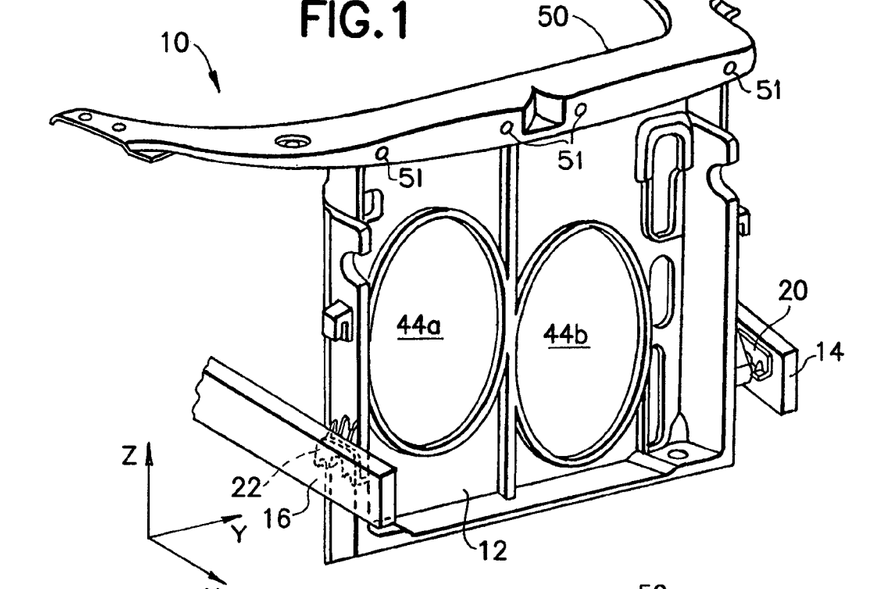
FIG. 1 is a perspective view of a structural carrier assembly in accordance with the present invention.

The structural carrier assembly 10 may be adapted for connection to front frame rails extending forward from the skeletal structure of the motor vehicle body, or to rear frame rails extending rearward from the skeletal structure of the motor vehicle body. The structural carrier assembly 10 will generally be discussed in this disclosure in terms of the frame rails 14, 16, which are generally depicted in FIG. 1 as extending forward from a motor vehicle body (not shown). However, it will be appreciated by those skilled in the art that the structural carrier assembly 10 is equally suitable for attachment to rear frame rails extending rearward from a motor vehicle body.

The structural carrier assembly 10 is generally adapted for quick, secure, and easy installation into the frame rails 14, 16 and may be used to mount various front (or rear end) elements or accessories of the motor vehicle. Such front end elements or accessories may include various front end vehicle systems, such as a steering system, braking system, powertrain, cooling system, electrical system, and the like, which are typically located in the front end of most motor vehicles. Such accessories and systems may be pre-assembled to the structural carrier assembly 10 and the structural carrier assembly installed as a distinct module in a motor vehicle front end, thereby streamlining the manufacturing process. As indicated previously, the structural carrier assembly 10 may be used in similar fashion to mount motor vehicle systems and accessories located at the rear end of a motor vehicle body.

A typical front end structure for a motor vehicle body includes a pair of forward-extending front frame rails generally similar to the frame rails 14, 16 illustrated in FIG. 1, for example. Such front frame rails generally extend forward from the skeletal structure of the motor vehicle body and provide the structural support necessary for supporting the elements of the motor vehicle located forward of the passenger compartment, particularly the engine and associated elements, such as the transmission, engine manifold and exhaust, and other front end elements or accessories directly or indirectly connected to the engine necessary for generating power for the motor vehicle. Thus, the "front" frame rails 14, 16 generally form the engine supporting structure at the front end of the motor vehicle body. The front frame rails 14, 16 generally described hereinabove are typically rigidly connected to the skeletal frame of the motor vehicle body and support the engine horizontally from below.

The structural carrier assembly 10 is generally comprised of the carrier member 12 and, typically, a pair of (i.e., left and right side) support brackets 20, 22 that are affixed to the frame rails 14, 16, respectively. As will be appreciated by those skilled in the art, the structural carrier assembly 12 may be adapted for use with a single frame member rather than the pair of frame rails 14, 16 depicted in FIG. 1, for example. Additionally, the present invention is not intended to be limited to the pair of frame rails 14, 16 illustrated in the Figures, but is intended to include any number of frame rails or members (i.e., three (3) or more).

The carrier member 12 is preferably a unitary, integrally formed structural member adapted to support one or more accessories of the motor vehicle. In particular, the carrier member 12 is preferably adapted to support one or more of the engine accessories necessary to cool the engine during operation, such as a radiator and cooling fan assembly, a heat exchanger, transmission oil cooler, coolant overflow bottle, and like elements. The carrier member 12 may also be used as a support location for mounting other miscellaneous elements located in the front end of a motor vehicle, such as an air conditioning unit, headlights, horn, battery, electrical fuse box, integral wire harnesses, windshield wiper washer fluid bottle, air pump, etc.

The support brackets 20, 22 are preferably formed of metal such as steel, and may be stamped steel members. However, the support brackets 20, 22 may also be formed of other metals such as aluminum or magnesium, or be formed from molded plastic material such as polyurethane. The support brackets 20, 22 are generally affixed to the frame rails 14, 16 preferably on the inner faces of the frame rails 14, 16 and are generally adapted to support the carrier member 12 in the vertical (i.e., Z-plane) direction and, further, limit fore-to-aft (i.e., X-plane) movement and, additionally, limit side-to-side (i.e., Y-plane movement) of the carrier member 12, as discussed further herein. Thus, the support brackets 20, 22 generally support the carrier member 12 between the frame rails 14, 16 as generally illustrated in FIG. 1.

The support brackets 20, 22 are preferably permanently attached to the frame rails 14, 16, for example by welding. However, the support brackets 20, 22 may also be removably attached to the frame rails 14, 16 by mechanical attachment (i.e., mechanical fasteners). The support brackets 20, 22 each have a unitary, generally L-shaped body 24 having opposing ends 26, 28, hereinafter referred to as "first end 26" and "second end 28". The respective support bracket bodies 24 preferably define respective openings 30 proximate to the inward-facing first ends 26 thereof. The second end 28 of each of the support bracket bodies 24 is affixed to the inner faces of the frame rails 14, 16 by any of the fastening methods described previously.

Figure 2:
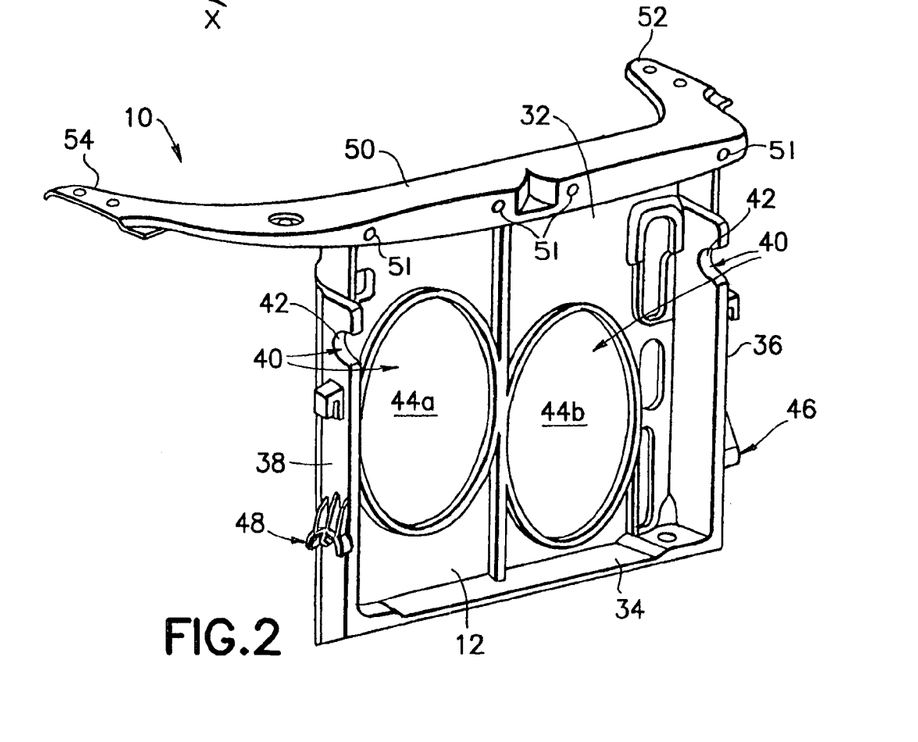
FIG. 2 is a perspective view of a carrier member and a cross frame of the structural carrier assembly shown in FIG. 1.
Figure 3:
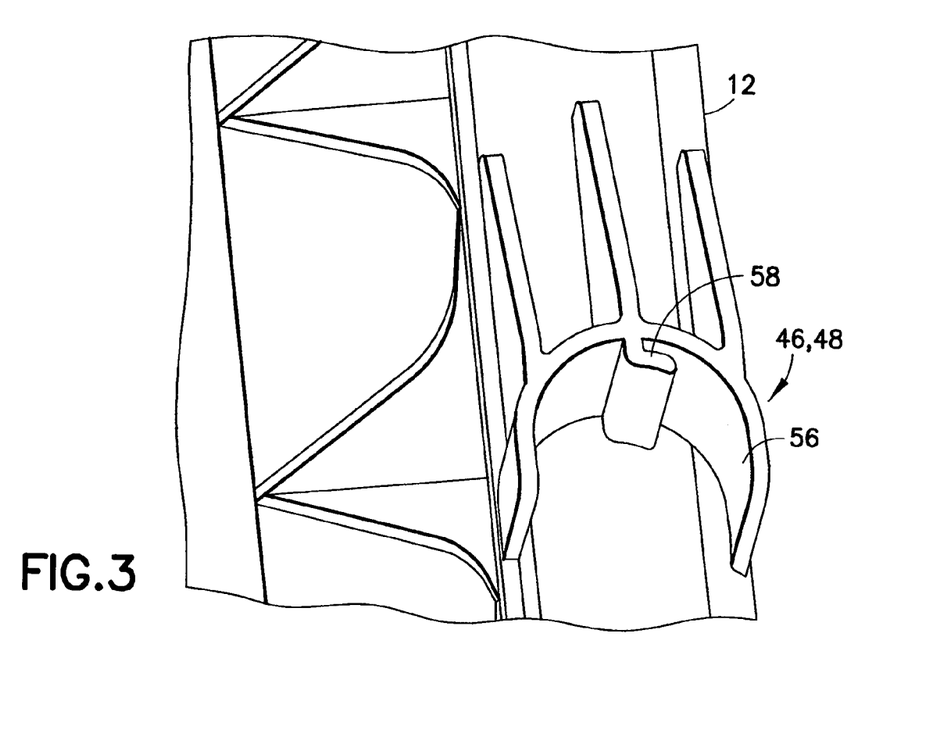
FIG. 3 is a top perspective view of an attachment clip provided on the carrier member in the structural carrier assembly shown in FIG. 1.
Figure 4:
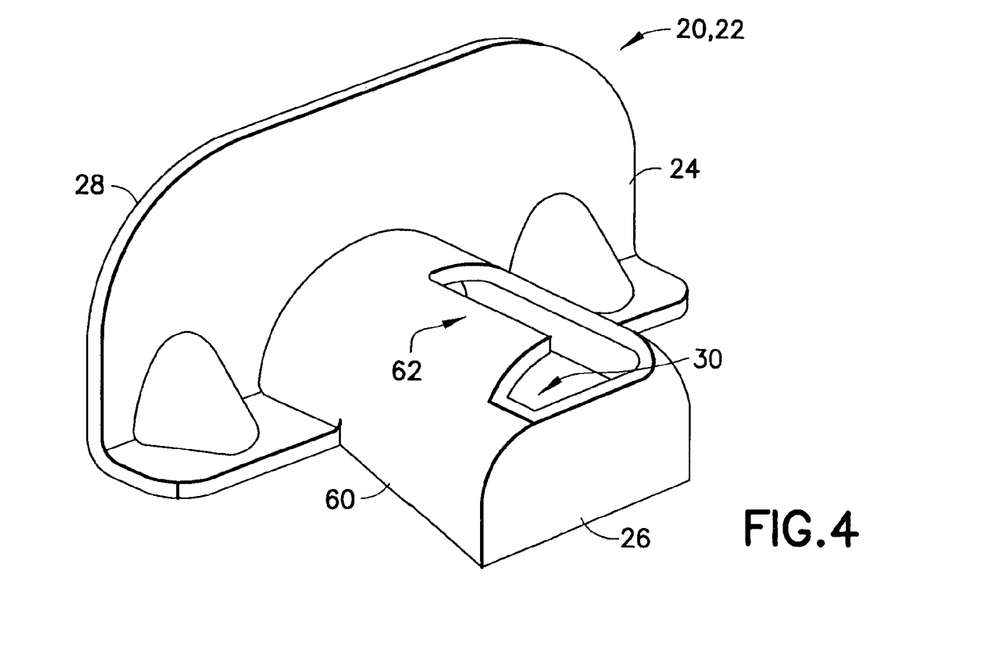
FIG. 4 is a top perspective view of a support bracket used to connect the carrier member to a frame rail of a motor vehicle body in the structural carrier assembly shown in FIG. 1.

As indicated previously, the carrier member 12 is preferably a unitary member. The carrier member 12, as shown in FIGS. 1 and 2, is substantially rectangular-shaped and has top and bottom ends 32, 34 and lateral left and right sides or ends 36, 38, also referred to herein as left and right stanchions 36, 38. The carrier member 12 may be formed integrally of molded plastic material, such as a thermoset or thermoplastic material, and have one more integrally formed accessory attachment mounts or locations 40. The carrier member 12 may also be formed of other materials such as metal including steel, stainless steel, aluminum, and magnesium, or formed of a composite material, or a filled or reinforced material. The accessory attachment mounts may include integrally formed mounting points 42 for directly supporting accessories of the motor vehicle or defined openings 44 in the carrier member 12 for supporting, for example, large engine accessories such as a radiator cooling fan or a heat exchanger. For example, the two large circular openings 44a, 44b depicted in FIGS. 1 and 2 are suitable for mounting a radiator cooling fan (not shown) and transmission oil cooler (not shown) of a motor vehicle engine.

The carrier member 12 further includes a pair of laterally disposed (i.e., left and right) attachment clips 46, 48 preferably formed integrally with the body of the carrier member 12. In particular, the attachment clips 46, 48 are preferably formed integrally with the left and right stanchions 36, 38, respectively, of the carrier member 12. The attachment clips 46, 48 are generally adapted to engage the support brackets 20, 22 and, in particular, engage the respective openings 30 formed in the support bracket bodies 24 of the support brackets 20, 22 to secure the carrier member 12 to the support brackets 20, 22 and the frame rails 14, 16, as discussed further herein. The attachment clips 46, 48 are not required to be formed integrally with the carrier member 12, and may be formed separately therefrom and attached to the carrier member 12 by any appropriate attachment method known in the art. Such attachment methods include, for example, welds, mechanical attachments (i.e., mechanical fasteners), adhesives, and snap-fit connections.

The structural carrier assembly 10 may further include an apron rail or cross frame 50 mounted to the carrier member 12. The apron rail or cross frame 50 is generally C-shaped or L-shaped when viewed in plan view. The cross frame 50 may be formed of one piece of metal such as steel, aluminum, or magnesium and stamped or hydroformed into the configuration depicted in FIGS. 1 and 2, for example. The cross frame or member 50 may also be formed from smaller pieces joined by various methods known in the automotive field. Additionally, the cross frame or member 50 may be formed from combinations of metal and non-metal reinforcements as well as from plastic including reinforced plastic. The cross frame 50 is typically attached to the top end 32 of the carrier member 12 by mechanical attachment(s) 51 (i.e., mechanical fasteners). The terms mechanical attachments or mechanical fasteners are intended to include, but are not limited to, bolts, nuts, protrusion weld nuts, J-clips, extruded nut features, rivets and like fastening elements in this disclosure. A substantially equivalent fastening arrangement to the mechanical attachments identified hereinabove include snap fit fasteners, such as interlocking or displacement type snap fit fasteners are also intended to be encompassed by this disclosure. The cross frame 50 includes two ends 52, 54, which are preferably adapted for connection to the skeletal frame of the motor vehicle body by mechanical attachment (i.e., mechanical fasteners) or welds. The attachment of the cross frame 50 to the skeletal frame of the motor vehicle body further secures the structural carrier assembly 10 in the front end of the motor vehicle further limiting vertical displacement (i.e., Z-plane movement), and limiting fore-to-aft (i.e., X-plane) movement of the carrier member 12 relative to the skeletal frame and, more particularly, the frame rails 14, 16. The cross frame 50 may also be secured to the carrier member 12 and the skeletal frame of the motor vehicle body by replacing the mechanical attachments 51 with permanent welds in accordance with the present invention. The terms welds and permanent welds are intended to include, but are not limited to, arc, mig, tig, spot, heat staking, or ultrasonic welds in this disclosure.

As indicated, the carrier member 12 may be adapted to collect and support miscellaneous front end accessories of a motor vehicle. Such accessories may be pre-assembled to the carrier member 12 to minimize the number of components that must be individually installed in the front end of a motor vehicle using the conventional assembly line manufacturing process discussed previously. For example, as shown in FIGS. 1 and 2, the carrier member 12 defines two mounting openings 44a, 44b suitable for mounting engine cooling accessories of the motor vehicle, such as a radiator and cooling fan assembly, heat exchanger, or a transmission oil cooler of the motor vehicle. These elements and other miscellaneous accessories may be pre-assembled to the carrier member 12 prior to installing the structural carrier assembly 10 in the motor vehicle front end, thereby expediting production of the motor vehicle by minimizing the number of parts that must be installed in the front end during a production run. Thus, the modular nature of the structural carrier assembly 10 of the present invention provides a lightweight, easy-to-handle structure for collecting and supporting miscellaneous front end accessories required for a motor vehicle. Additionally, the cross frame 50 may be used as an additional location to mount additional front end accessories including, for example, the headlights, fenders, battery and like elements found in a motor vehicle front end, which may also be pre-assembled to the cross frame 50 further enhancing the modular nature of the front end assembly 10.

Figure 5:
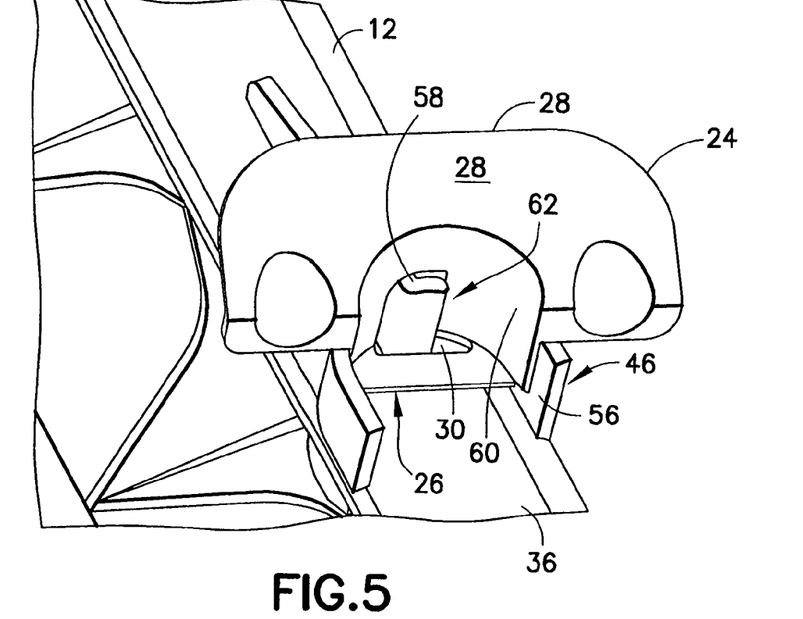
FIG. 5 is a perspective view showing partial engagement of an attachment clip with a support bracket in the structural carrier assembly shown in FIG. 1.
Figure 6:
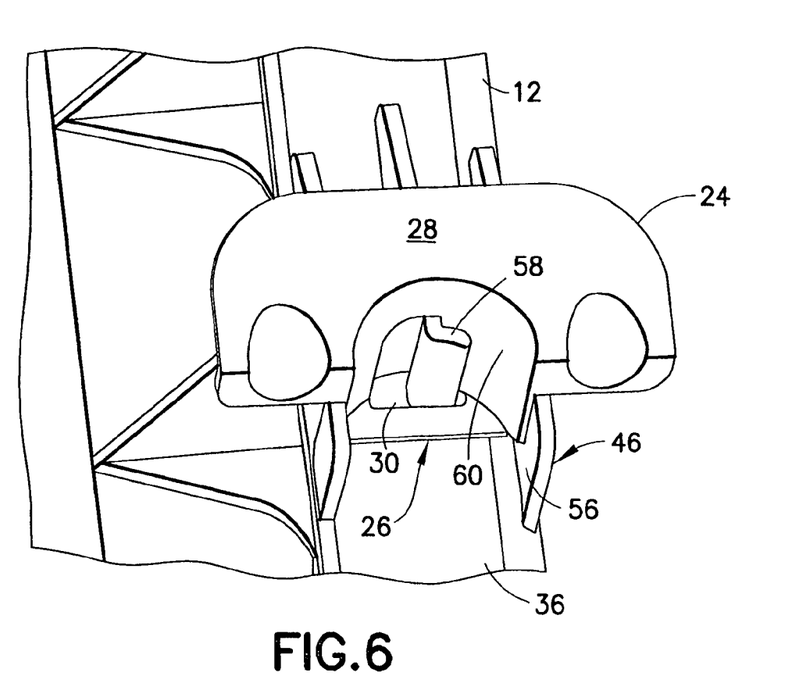
FIG. 6 is a perspective view showing full engagement of an attachment clip with a support bracket in the structural carrier assembly shown in FIG. 1.

Referring now to FIGS. 1-6, the connection arrangement between the carrier member 12 and the support brackets 20, 22 will be discussed in further detail. The attachment clips 46, 48 provided on the left and right stanchions 36, 38 of the carrier member 12 each preferably include an integrally formed fulcrum cup 56 and locking tab 58 adapted to engage the openings 30 formed in the support bracket bodies 24. As shown in FIGS. 5 and 6, the locking tabs 58 may be generally L-shaped and engage corresponding L-shaped mating openings 30 to secure the left and right stanchions 36, 38 to the support brackets 20, 22 and, further, to the frame rails 14, 16, respectively.

Figure 8:
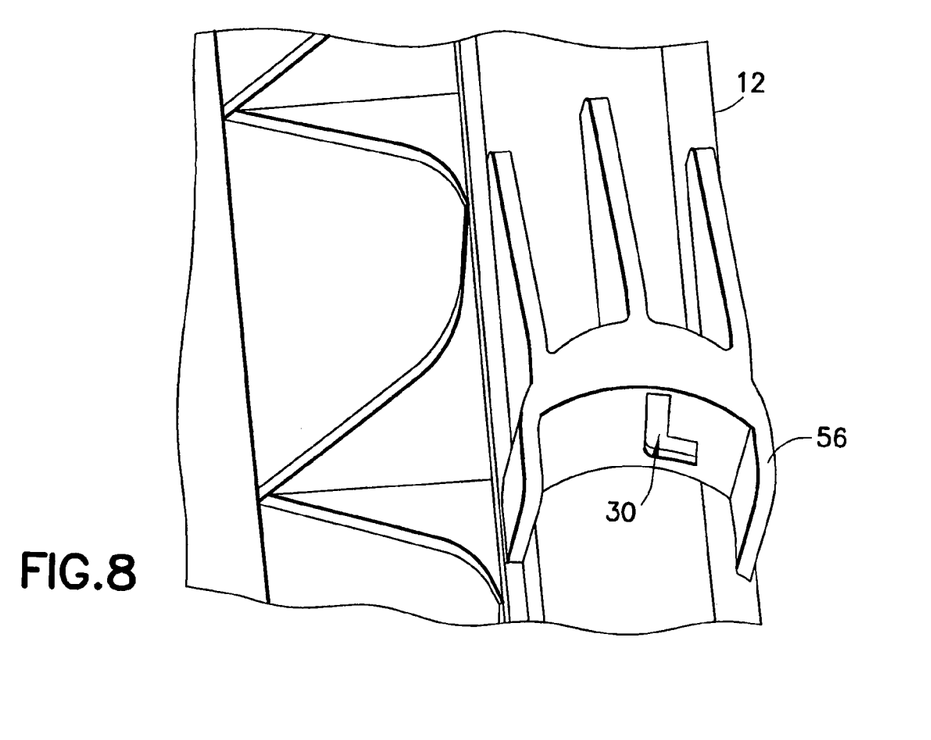
FIG. 8 is a perspective view of an alternative embodiment of the carrier member shown in FIG. 3.
Figure 9:
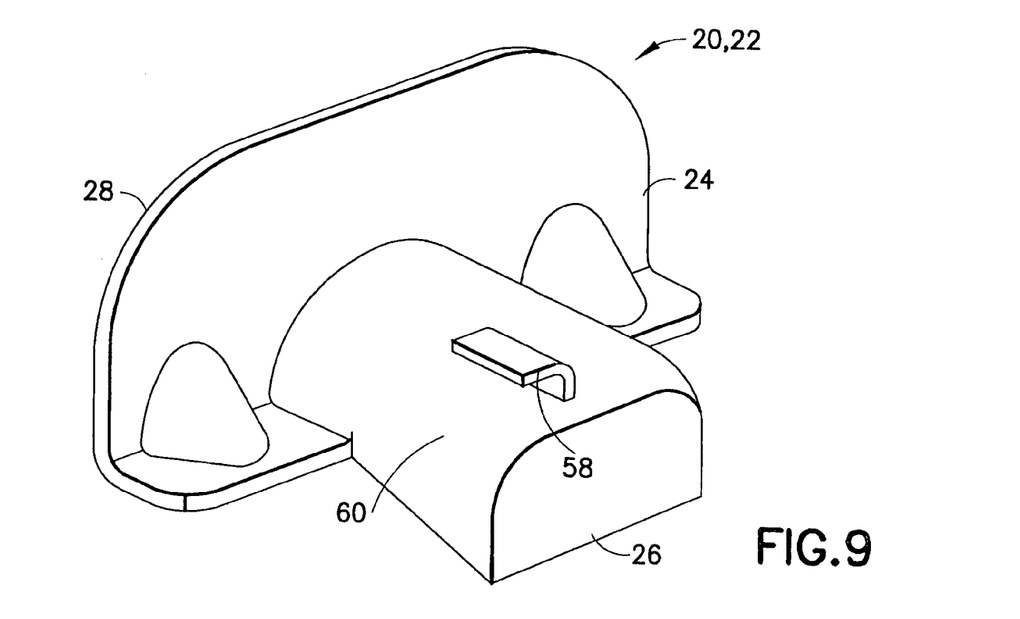
FIG. 9 is a perspective view of an alternative embodiment of the support bracket shown in FIG. 4.

However, the locking tabs 58 and mating openings 30 may take other forms in accordance with the present invention. For example, the locking tabs 58 may be T-shaped, and engage T-shaped mating openings 30 or the locking tabs 58 and mating openings 30 may take another generally polygonal-type shaped form. Additionally, the present invention envisions that the locking tab 58-mating opening 30 arrangement may be replaced by a simple mechanical connection where the locking tabs 58 are affixed directly to the support bracket bodies 24, for example directly by mechanical fasteners, and do not engage a corresponding or mating opening in the support bracket bodies 24. Moreover, the present invention further envisions that a cam lock arrangement between the attachment clips 46, 48 and the support brackets 20, 22 may be used to secure the connection between the carrier member 12 and the support brackets 20, 22. Furthermore, as shown in FIGS. 8 and 9, the locations for the attachment clips 46, 48 and the mating openings 30 may generally be reversed in accordance with the present invention. In particular, the locking tabs 58 may be provided on the support brackets 20, 22 and the mating openings 30 may be formed in the fulcrum cups 56 provided on the carrier member 12 in this variation of the structural carrier assembly 10. Thus, the locations of the attachment clips 46, 48 and the mating openings 30 are generally reversed in the structural carrier assembly 10 configuration depicted in FIGS. 8 and 9.

FIG. 5 illustrates the partial insertion of one of the locking tabs 58 in the mating opening 30 in one of the support bracket bodies 24. As may be seen in FIG. 5, the L-shape of the locking tab 58 is inserted into the L-shaped mating opening 30 so that the lower leg of the L-shape of the locking tab 58 substantially engages the upper leg of the L-shape of the mating opening 30. As FIG. 5 illustrates, the fulcrum cup 56 is generally semi-circular shaped and engages or receives a correspondingly-shaped semi-circular portion 60 of the support bracket body 24 and guides entry of the locking tab 58 into the L-shaped mating opening 30. The fulcrum cup 56 is generally adapted to align the carrier member 12 relative to the support brackets 20, 22 so that the locking tab 58 automatically engages the mating opening 30 during assembly of the structural carrier assembly 10, as discussed further herein.

FIG. 6 shows the complete engagement of the locking tab 58 illustrated in FIG. 5 with the support bracket body 24. In the fully engaged position, the lower leg of the L-shape of the locking tab 58 engages the support bracket body 24 and, more particularly, a lip portion 62 on the semi-circular portion 60 of the support bracket body 24. The lip portion 62 is generally formed by the outline of the L-shaped mating opening 30 in the support bracket body 24. The lip portion 62 generally prevents retraction of the locking tab 58 from the support bracket body 24 once inserted into the L-shaped mating opening 30. In particular, the engagement of the locking tab 58 with the support bracket body 24 and, in particular, the lip portion 62 on the semi-circular portion 60 of the support bracket body 24, limits upward (i.e., Z-plane) movement of the carrier member 12 relative to the frame rails 14, 16 once the locking tab 58 is inserted into the support bracket body 24. Additionally, the engagement of the L-shaped locking tabs 58 and the openings 30 in the support bracket bodies 24 of the support brackets 20, 22 limits the fore-to-aft (i.e., X-plane) movement of the carrier member 12 relative to the support brackets 20, 22 and, more particularly, the frame rails 14, 16.

Moreover, by virtue of the fixed positioning of the support brackets 20, 22 on the inner faces of the frame rails 14, 16, the carrier member 12 is restrained in side-to-side (i.e., Y-plane) movement relative to the frame rails 14, 16. Additionally, Y-plane movement of the carrier member 12 relative to the frame rails 14, 16 is further restrained by using mechanical fasteners 51 to attach the carrier member 12 to the cross frame 50 and the cross frame 50 to the skeletal frame of the motor vehicle body. Once the cross frame 50 is affixed to the skeletal frame of the motor vehicle body, the carrier member 50 will be further restrained in fore-to-aft (i.e., X-plane) and vertical (i.e., Z-plane) movement. If desired, an adhesive may be applied to the attachment clips 46, 48 prior to engaging the attachment clips 46, 48 with the support brackets 20, 22.

While the present invention was described with reference to a semi-circular shaped portion 60 adapted to be received in a generally semi-circular shaped fulcrum cup 56, the semi-circular shaped portion 60 and the fulcrum cup 56 may take other corresponding or mating shapes, such as oval, polygonal, etc., and the present invention is not intended to be limited to this particular mating configuration. The fulcrum cup 56 may be shaped in any manner to enable the carrier member 12 to be guided or aligned relative to the support brackets 20, 22 so that locking tabs 58 automatically engage the mating openings 30 in the support brackets 20, 22 during installation of the structural carrier assembly 10.

Figure 7A:
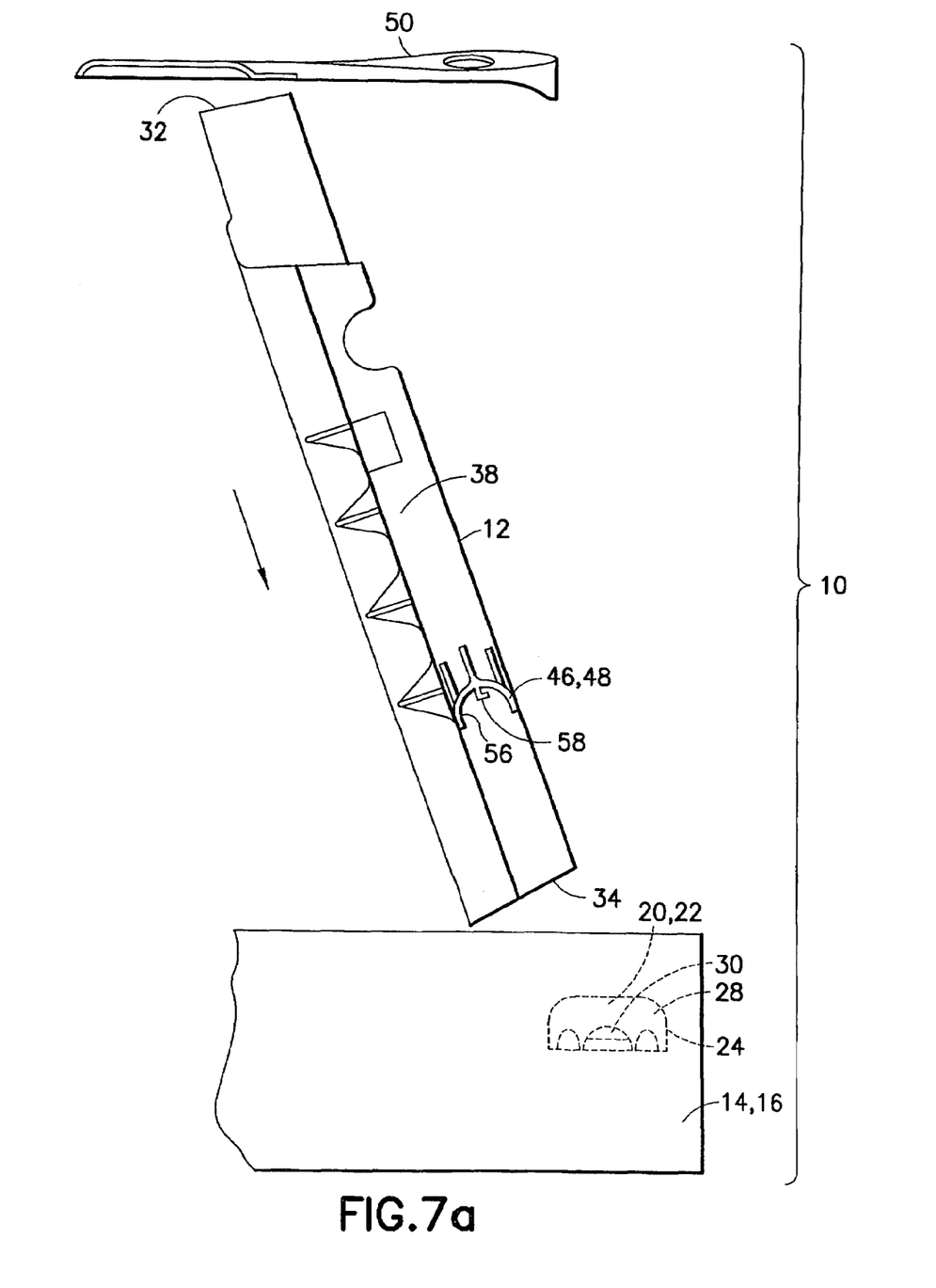
FIGS. 7a-7c are side views showing assembly steps for connecting the carrier member to the support brackets in the structural carrier assembly shown in FIG. 1, and generally installing the structural carrier assembly in a motor vehicle front or rear end in accordance with the present invention.
Figure 7B:
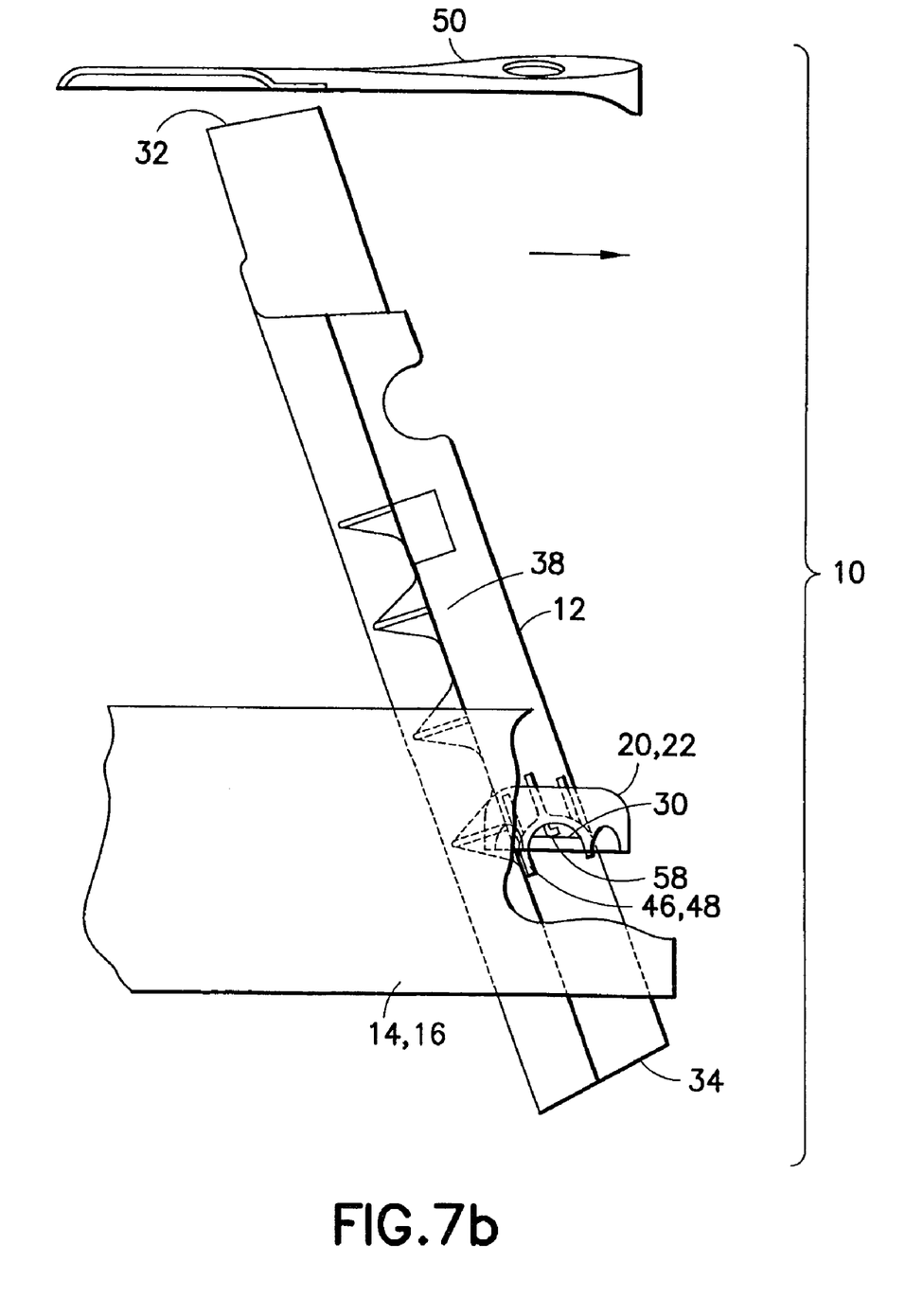
Figure 7C:
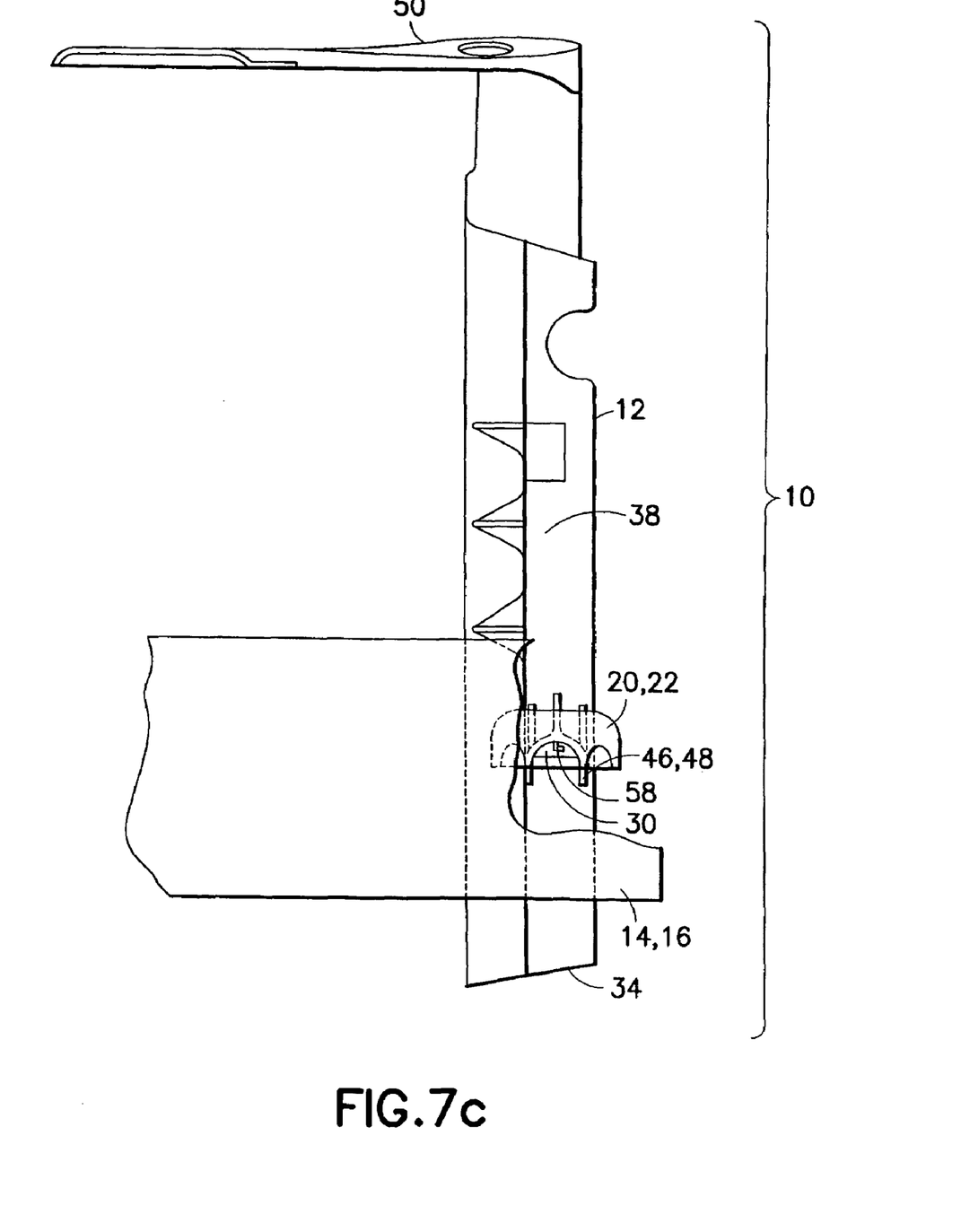

With the respective elements of the structural carrier assembly 10 now described, the general method of installing the structural carrier assembly 10 in a motor vehicle front end will now be discussed with reference to FIGS. 1-7, but with particular emphasis on FIGS. 7a-7c. FIGS. 7a-7c show the general method steps for installing the structural carrier assembly 10 in a motor vehicle front end in accordance with the present invention. Initially, the support brackets 20, 22 are attached to the frame rails 14, 16 extending from the motor vehicle body by any of the attachment methods described previously. In particular, the second end 28 of the support bracket body 24 of each of the support brackets 20, 22 is affixed to the inner faces of the frame rails 14, 16.

The carrier member 12 is then positioned on the support brackets 20, 22, such that the fulcrum cups 56 on the attachment clips 46, 48 engage the semi-circular portions 60 of the support bracket bodies 24. The carrier member 12 may then be rotated in a preferably forward direction (or a rearward direction as necessary) relative to the frame rails 14, 16. The semi-circular shape of the fulcrum cups 56 guide the rotational movement of the carrier member 12 relative to the support brackets 20, 22, such that carrier member 12 is guided or aligned to a position where the locking tabs 58 of the attachment clips 46, 48 engage the mating openings 30 in the support bracket bodies 24 of the support brackets 20, 22. The rotational movement of the carrier member 12 causes the locking tabs 58 to engage the mating openings 30 until the locking tabs 58 snap fully into engagement with the support brackets 20, 22.

The engagement of the locking tabs 58 with the brackets 20, 24 limits upward (Z-plane) movement of the carrier member 12 relative to the frame rails 14, 16. Additionally, the engagement of the locking tabs 58 with the mating openings 30 in the support bracket bodies 24 substantially limits the fore-to-aft (i.e., X-plane) movement of the carrier member 12 relative to the support brackets 20, 22 and, more particularly, the frame rails 14, 16. Moreover, by virtue of the fixed positioning of the support brackets 20, 22 on the inner faces of the frame rails 14, 16, the carrier member 12 is restrained in side-to-side (i.e., Y-plane) movement relative to the frame rails 14, 16. In particular, Y-plane movement of the carrier member 12 relative to the frame rails 14, 16 is restrained by mechanically fastening the carrier member 12 to the cross frame 50 and the cross frame 50 to the skeletal frame of the motor vehicle body. The engagement of the attachment clips 46, 48 with the support brackets 20, 22, respectively, secures the carrier member 12 to the frame rails 14, 16.

With the carrier member 12 now secured to the frame rails 14, 16, the cross frame 50 may be attached to the upper or top end 32 of the carrier member 12 by the attachment methods discussed previously. Once the cross frame 50 is connected to the carrier member 12, the ends 52, 54 of the cross frame 50 may be affixed to the skeletal frame of the motor vehicle body by the attachment methods discussed previously. The attachment of the cross frame 50 to the motor vehicle body will further restrain the fore-to-aft (i.e., X-plane) and vertical (i.e., Z-plane) movement of the carrier member 12 relative to the front frame rails. The cross frame 50 may be pre-assembled to the carrier member 12 before the carrier member 12 is secured to the support-brackets 20, 22.

As indicated previously, the carrier member 12 is formed with one or more attachment mounts 40. The attachment mounts 40 may be used as locations to attach elements of the motor vehicle front end before the structural carrier assembly 10 is connected to the motor vehicle body. Rubber isolators may be used at the fixed attachment mounts or locations 40 to isolate elements of the motor vehicle front end that are to be attached to the carrier member 12. As indicated previously, such front end elements may include engine accessories for the motor vehicle, as well as other items. In the example provided previously, the mounting openings 44a, 44b may be used as mounting locations for the radiator and cooling fan assembly and the transmission oil cooler. As will be appreciated by those skilled in the art, the various front end items identified in this disclosure may also be attached to the structural carrier assembly 10 after installation in the motor vehicle front end as is conventionally done in the art.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims.

What is claimed is:

1. A motor vehicle structural carrier assembly, comprising:
    at least one support bracket adapted for direct connection to at least one frame rail;
    a carrier member adapted for connection to the at least one support bracket, the at least one support bracket adapted to support the carrier member on the at least one frame rail; and
    at least one attachment clip provided on one of the carrier member and the at least one support bracket and adapted to engage the other of the carrier member and the at least one support bracket to secure the connection therebetween.

2. The structural carrier assembly of claim 1, wherein the carrier member and the at least one support bracket are formed of metal.

3. The structural carrier assembly of claim 1, wherein the carrier member and the at least one support bracket are formed of molded plastic material.

4. The structural carrier assembly of claim 1, wherein the carrier member and the at least one support bracket are formed of different materials.

5. The structural carrier assembly of claim 1, further comprising a cross frame mounted to an upper end of the carrier member by removable mechanical attachments.

6. The structural carrier assembly of claim 1, further comprising a cross frame fixedly attached to an upper end of the carrier member.

7. The structural carrier assembly of claim 1, wherein the at least one attachment clip comprises an integral fulcrum cup and locking tab, the locking tab being adapted to engage a mating opening formed in the at least one support bracket to connect the carrier member to the at least one support bracket.

8. The structural carrier assembly of claim 7, wherein the mating opening is a polygonal-shaped mating opening.

9. The structural carrier assembly of claim 7, wherein the fulcrum cup is adapted to receive at least a portion of the at least one support bracket when the at feast one attachment clip connects the carrier member to the at least one support bracket.

10. The structural carrier assembly of claim 7, wherein the fulcrum cup is substantially semicircular.

11. The structural carrier assembly of claim 1, wherein the carrier member further comprises at least one integrally formed attachment mount adapted to support at least one accessory.

12. The structural carrier assembly of claim 1, wherein the at least one attachment clip comprises an integral fulcrum cup and mating opening and said at least one support bracket comprises a locking tab, said locking tab being adapted to engage the mating opening thereby forming said connection.

13. A motor vehicle structural carrier assembly, comprising:
    at least one support bracket adapted for direct connection to at least one frame rail; and
    a carrier member having at least one attachment clip adapted for engagement with the at least one support bracket to secure a connection between the carrier member and the at least one support bracket, the at least one support bracket capable of supporting the carrier member on the at least one frame rail.

14. The structural carrier assembly of claim 13, wherein the carrier member and the at least one support bracket are formed of metal.

15. The structural carrier assembly of claim 13, wherein the carrier member and the at least one support bracket are formed of molded plastic material.

16. The structural carrier assembly of claim 13, wherein the carrier member and the at least one support bracket are formed of different materials.

17. The structural carrier assembly of claim 13, further comprising a cross frame mounted to an upper end of the carrier member by removable mechanical attachments.

18. The structural carrier assembly of claim 13, further comprising a cross frame fixedly attached to an upper end of the carrier member.

19. The structural carrier assembly of claim 13, wherein the at least one attachment clip comprises an integral fulcrum cup and locking tab, the locking tab being adapted to engage a mating opening formed in the at least one support bracket to connect the carrier member to the at least one support bracket.

20. The structural carrier assembly of claim 19, wherein the mating opening is a polygonal-shaped mating opening.

21. The structural carrier assembly of claim 19, wherein the fulcrum cup is adapted to receive at least a portion of the at least one support bracket when the at least one attachment clip connects the carrier member to the at least one support bracket.

22. The structural carrier assembly of claim 19, wherein the fulcrum cup is substantially semicircular.

23. The structural carrier of claim 13, wherein the carrier member further comprises at least one integrally formed attachment mount adapted to support at least one accessory of the motor vehicle.

24. The structural carrier assembly of claim 13, wherein the at least one attachment clip comprises an integral fulcrum cup and a mating opening and said support bracket comprises a locking tab, the locking tab being adapted to engage the mating opening thereby forming said connection.

25. A method of installing a structural carrier assembly in a motor vehicle, comprising:
attaching at least one support bracket directly to at least one frame rail;
positioning a carrier member on the at least one support bracket; and
adjusting the carrier member such that at least one attachment clip provided on one of the carrier member and the at least one support bracket engages the other of the carrier member and the at least one support bracket and secures a connection between the carrier member and the at least one support bracket.

26. The method of claim 25, further comprising mounting a cross frame to an upper end of the carrier member by one of removable mechanical attachments and permanent welds.

27. The method of claim 25, wherein the at least one attachment clip comprises an integral fulcrum cup and locking tab provided on one of the carrier member and the at least one support bracket, the locking tab engaging a mating opening formed in the other of the carrier member and the at least one support bracket when the carrier member is rotated, and secures a connection between the carrier member and the at least one support bracket.

28. The method of claim 27, wherein the mating opening is a polygonal-shaped mating opening.

29. The method of claim 27, wherein the fulcrum cup aligns the carrier member on the at least one support bracket when the carrier member is rotated, such that the locking tab automatically engages the mating opening.

30. The method of claim 25, wherein the at least one attachment clip comprises an integral fulcrum cup and locking tab provided on the carrier member, the locking tab engaging a mating opening formed in the at least one support bracket when the carrier member is rotated, and secures a connection between the carrier member and the at least one support bracket.

31. The method of claim 30, wherein the mating opening is a polygonal-shaped mating opening.

32. The method of claim 30, wherein the fulcrum cup aligns the carrier member on the at least one support bracket when the carrier member is rotated, such that the locking tab automatically engages the mating opening.

33. The method of claim 30, wherein the fulcrum cup receives at least a portion of the at least one support bracket when the at least one attachment clip connects the carrier member to the at least one support bracket.

* * * * *